(12) United States Patent
McConnell et al.

(10) Patent No.: US 8,923,334 B2
(45) Date of Patent: *Dec. 30, 2014

(54) UPPER LAYER PROTOCOL SELECTION

(71) Applicant: Dell Products L.P., Round Rock, TX (US)

(72) Inventors: Daniel McConnell, Round Rock, TX (US); Matthew Weeden Baker, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/949,685

(22) Filed: Jul. 24, 2013

(65) Prior Publication Data

US 2013/0311636 A1    Nov. 21, 2013

Related U.S. Application Data

(63) Continuation of application No. 12/120,485, filed on May 14, 2008, now Pat. No. 8,514,884.

(51) Int. Cl.
| | |
|---|---|
| *H04J 3/22* | (2006.01) |
| *H04J 3/24* | (2006.01) |
| *H04J 3/16* | (2006.01) |
| *H04L 29/08* | (2006.01) |
| *H04L 29/06* | (2006.01) |

(52) U.S. Cl.
CPC ............... *H04L 67/14* (2013.01); *H04L 69/18* (2013.01); *H04L 69/326* (2013.01); *H04L 128/462* (2013.01)
USPC ........................................................ 370/469

(58) Field of Classification Search
CPC ...................................................... H04L 67/14
USPC ........................................................ 370/469
See application file for complete search history.

(56) References Cited

U.S. PATENT DOCUMENTS

| | | | |
|---|---|---|---|
| 590,705 | A | 9/1897 | Killmeier |
| 5,437,046 | A | 7/1995 | Bright et al. |
| 7,061,861 | B1 | 6/2006 | Mekkittikul et al. |
| 7,296,288 | B1 | 11/2007 | Hill et al. |
| 8,341,262 | B2 | 12/2012 | Pirzada et al. |
| 8,514,884 | B2 * | 8/2013 | McConnell et al. .......... 370/469 |
| 2001/0042058 | A1 | 11/2001 | Harrington et al. |
| 2001/0053947 | A1 | 12/2001 | Lenz et al. |
| 2004/0057424 | A1 | 3/2004 | Kokkonen |
| 2004/0095923 | A1 | 5/2004 | Ejzak et al. |
| 2004/0098506 | A1 * | 5/2004 | Jean ............................. 709/245 |
| 2005/0066044 | A1 | 3/2005 | Chaskar et al. |
| 2006/0251067 | A1 | 11/2006 | DeSanti et al. |

(Continued)

OTHER PUBLICATIONS

C.M. Guager, Modeling and performance Evaluation of iSCSI storage Area Network over TCP/IP-based MAN and WAN networks, IEEE 2005, p. 1-9.*

*Primary Examiner* — Mark Rinehart
*Assistant Examiner* — Maharishi Khirodhar
(74) *Attorney, Agent, or Firm* — Haynes and Boone, LLP

(57) ABSTRACT

A network communication selection system includes one or more subsystems to allow network communications with an endpoint device. The system determines whether a data center Ethernet (DCE) capable network is available to communicate with the endpoint device, determines whether the endpoint device is local or remote and selects a network communication protocol from a plurality of network communication protocols to communicate with the endpoint device.

20 Claims, 3 Drawing Sheets

(56) References Cited

U.S. PATENT DOCUMENTS

| | | |
|---|---|---|
| 2007/0058670 A1 | 3/2007 | Konduru et al. |
| 2007/0064623 A1 | 3/2007 | Brahmaroutu |
| 2007/0180106 A1 | 8/2007 | Pirzada et al. |
| 2007/0248102 A1 | 10/2007 | Wang et al. |
| 2008/0144663 A1 | 6/2008 | Johnson et al. |
| 2008/0195747 A1 | 8/2008 | Elmaliah |
| 2008/0198749 A1 | 8/2008 | Nguyen et al. |
| 2009/0086635 A1 | 4/2009 | DeCusatis et al. |
| 2009/0147704 A1 | 6/2009 | Moore |

* cited by examiner

UPPER LAYER PROTOCOL SELECTION

CROSS REFERENCE TO RELATED APPLICATION

The present application claims priority to and is a continuation of co-owned, co-pending U.S. patent application Ser. No. 12/120,485 filed May 14, 2008, the disclosure of which is incorporated herein by reference.

BACKGROUND

The present disclosure relates generally to information handling systems, and more particularly to an upper layer protocol (ULP) selection based on detection of a lossless datacenter Ethernet network.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and/or networking systems.

One common networking system is known as the Ethernet. The Ethernet generally makes no provisions for reliability, sophisticated congestion management, or ordered delivery. In fact, as defined today, the Ethernet generally deals with data congestion, quality of service (QoS) throttling, and other networking realities and services by simply dropping data frames. As such, Upper Layer Protocols (ULPs) are expected to make provisions for reliability, if required. QoS refers to resource reservation control mechanisms rather than the achieved service quality. Thus, QoS is the ability to provide different priority to different applications, users, or data flows, or to guarantee a certain level of performance to a data flow.

As an example of a provision for reliability, initiator small computer system interface (iSCSI) is a storage solution typically deployed on Ethernet based internet protocol (IP) networks. Storage Area Networks (SANs) are characterized by a requirement for transmission reliability. Today, iSCSI relies on the Layer 4 transmission control protocol (TCP) to provide congestion management to avoid lost data packets and to guarantee transmission reliability to recover in the event of a dropped data packet. TCP congestion management and reliability capabilities, however, are not without cost. TCP adds additional per packet overhead for control data, acknowledgement processing, and etc. TCP also requires additional processing cycles/copies as data is moved from TCP to application memory buffers.

Accordingly, it would be desirable to provide an improved ULP selection absent the disadvantages discussed above.

SUMMARY

According to one embodiment, a network communication selection system includes one or more subsystems to allow network communications with an endpoint device. The system determines whether a data center Ethernet (DCE) capable network is available to communicate with the endpoint device, determines whether the endpoint device is local or remote and selects a network communication protocol from a plurality of network communication protocols to communicate with the endpoint device.

DETAILED DESCRIPTION

For purposes of this disclosure, an information handling system (IHS) 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
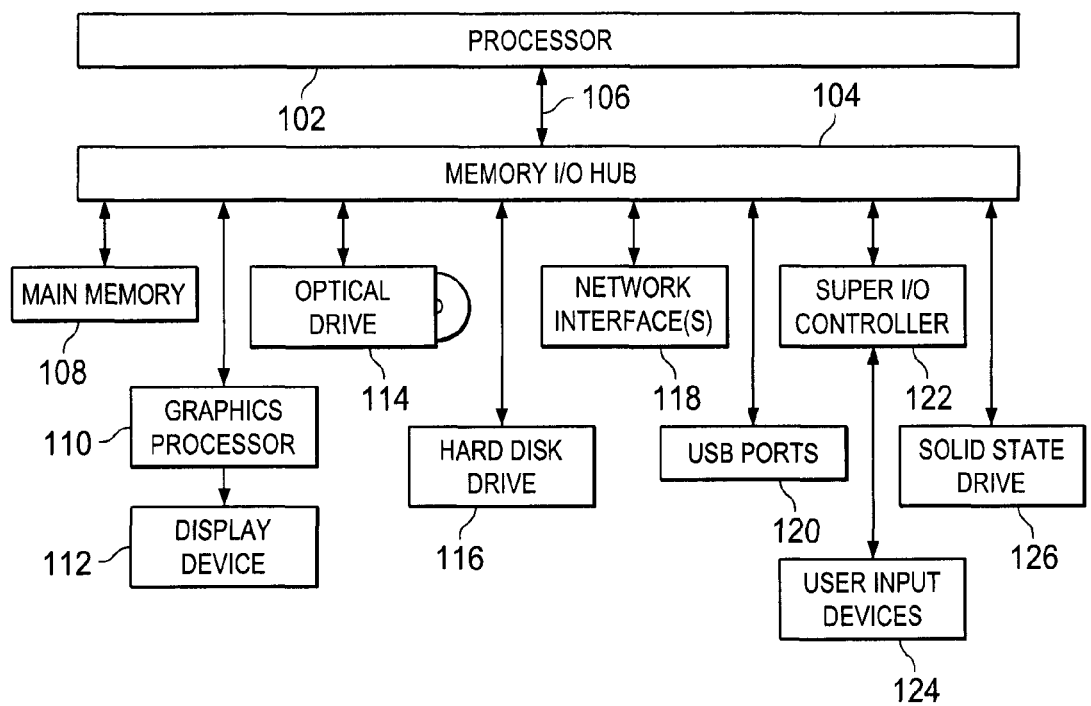
FIG. 1 illustrates an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

It should be understood by one having ordinary skill in the art that a network communication system to communicate, via an IHS 100, using the network interface 118 may communicate via a network using a TCP/IP model. The TCP/IP model may include five main layers of operation. Layer 1 is known as a physical layer and includes an Ethernet physical layer, modems, optical fiber, coaxial cable, and a variety of physical layer items. Layer 2 is known as a data link layer and includes DCE, Wi-Fi, Wi-MAX and a variety of data links. Layer 3 is known as a network/Internet layer and includes Internet protocol (IP) and a variety of networks. Layer 4 is known as a transport layer and includes TCP, UDP, and a variety of other transport layer items. Layer 5 is known as an application layer and includes iSCSI, HTTP and a variety of applications.

With regard to networking for IHSs, datacenter Ethernet (DCE) technologies enable improved quality of service capabilities, Layer 2 based congestion management, and mechanisms to ensure lossless delivery of Ethernet data frames. DCE generally describes an enhanced Ethernet that may enable convergence of various applications in data centers (e.g., local area network (LAN), storage area network (SAN), high performance computing (HPC) and/or a variety of other applications) onto a single interconnect technology. DCE allows applications that have traditionally relied on "reliable" ULP protocols, like TCP, for congestion management and guaranteed delivery to instead rely upon DCE functionality at Layer 2 for these capabilities. This, in turn, may allow applications to use alternate protocols, like UDP, with lower control data and processing overhead when operating in DCE environments. Alternately, protocol processing can be streamlined/shortcut when operating on local DCE networks. For example, a "DCE aware" iSCSI implementation could utilize UDP at Layer 4 to improve performance and reduce processing requirements when operating on a local DCE network.

Using DCE technologies, it is possible for DCE aware applications to detect DCE capability and alter network transmission methodology to achieve higher performance with lower CPU 102 overhead. The present disclosure discloses a process by which applications and/or ULPs may change/manipulate Layer 4 protocol usage to improve IHS 100 performance.

Figure 2:
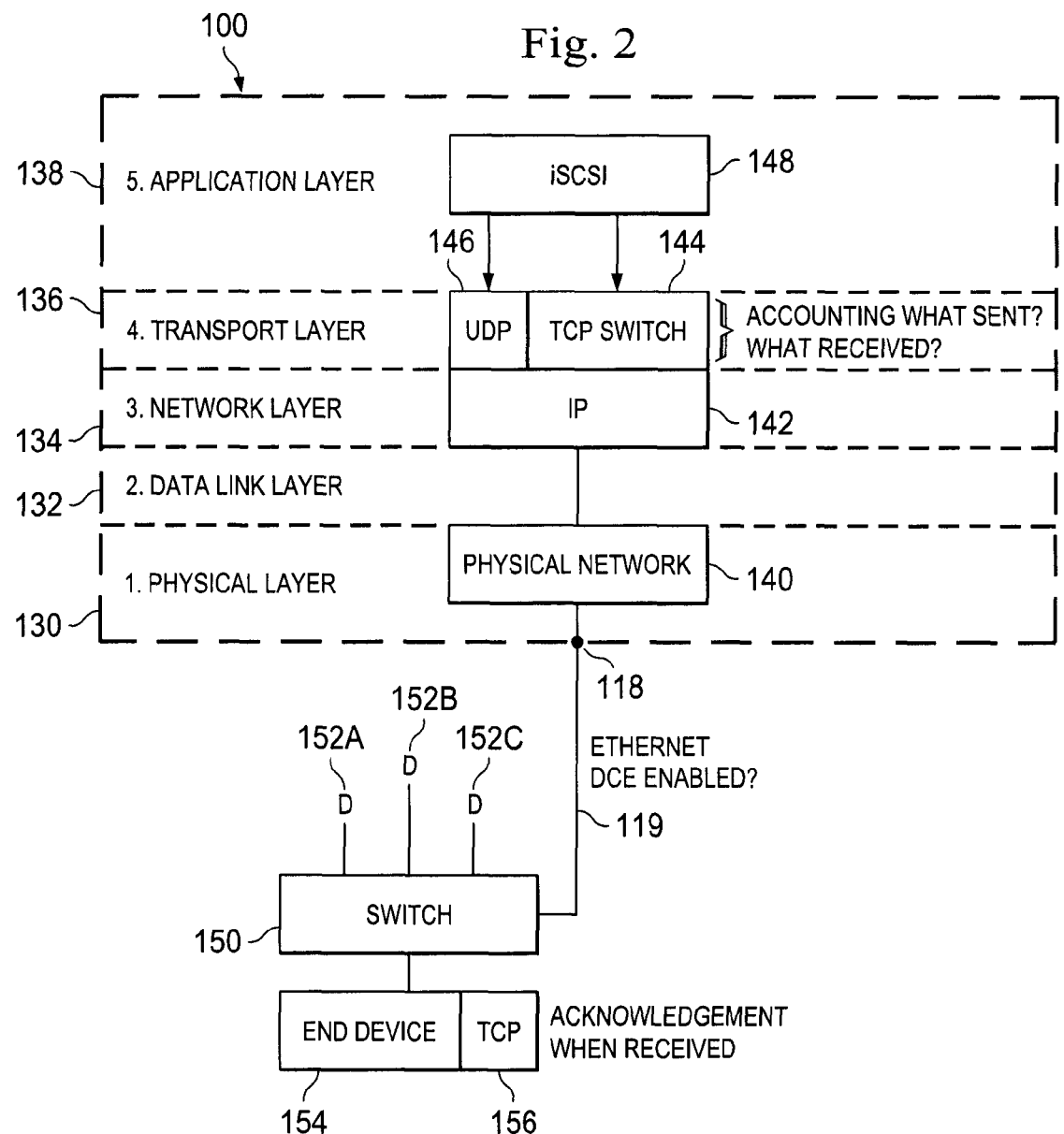
FIG. 2 illustrates a block diagram of an embodiment of a upper layer protocol (ULP) selection/manipulation system based on detection of a lossless datacenter Ethernet network.

FIG. 2 illustrates a block diagram of an embodiment of a ULP selection/manipulation system based on detection of a lossless datacenter Ethernet network. In an embodiment, the IHS 100 includes the five-layer TCP/IP model including a physical layer 1, 130 (represented as a physical network 140); a data link layer 2, 132 (represented as a coupling between an internet protocol (IP) 142 and the physical network 140); a network layer 3, 134 (represented as the internet protocol (IP) 142); a transport layer 4, 136 (represented as a TCP switch and/or a user datagram protocol (UDP) 146); and an application layer 5, 138 (represented as an initiator small computer system interface (iSCSI) 148).

The IHS 100 may communicate with an end device 154 (e.g., another IHS 100) by sending data packets through the network interface 118 and a switch 150. Additionally, the switch 150 may receive data packets from multiple sources and directs the data packets (e.g., 152A, 152B and 152C) to the proper location. In an embodiment, the end device 154 includes a TCP switch 156 that returns an acknowledgement to the IHS 100 when the proper data packets have been received from the IHS 100. The traditional Ethernet does not provide guaranteed delivery of the data packets. Therefore, in an embodiment a communication link network 119 coupling the IHS 100 and the switch 150 is a data center enabled Ethernet (DCE). A DCE is an enhanced Ethernet that enables convergence of various applications in data centers such as LAN, SAN, and/or HPC, into a single interconnect technology. A DCE is generally known as lossless and manages send and receive information, such as requesting "send me the amount of data for however much space or bandwidth is available on the communication channel 119." However, it should be understood that other network systems may be used with the present disclosure.

In an embodiment, the ULP selection/manipulation system queries the network 119 and decides if the network 119 is a data center Ethernet (DCE), and if so, uses lower processor overhead communication protocols such as, user datagram protocol (UDP) rather than transport control protocol (TCP) and thus frees up processor 102 capacity. DCE networks generally require special switches such as switch 150 to properly pass the data packets (e.g., 152A, 152B, 152C and data packets between the IHS 100 and the end device 154). The special switches 150 (e.g., switches that allow a UDP communication protocol to be passed through the switch 150) should be used and thus the system is less likely to drop/lose the data packets. In an embodiment, if the system detects that the system is dropping packets of data, the system may switch back to a more processor intensive communication protocol (e.g., a regular protocol or TCP/IP having a communication delivery guarantee. Also in an embodiment, a DCE network monitors communication activity and may tell the sender IHS 100 to slow down communication to avoid dropping data packets when capacity of the network 119 is full or nearly full.

Figure 3:
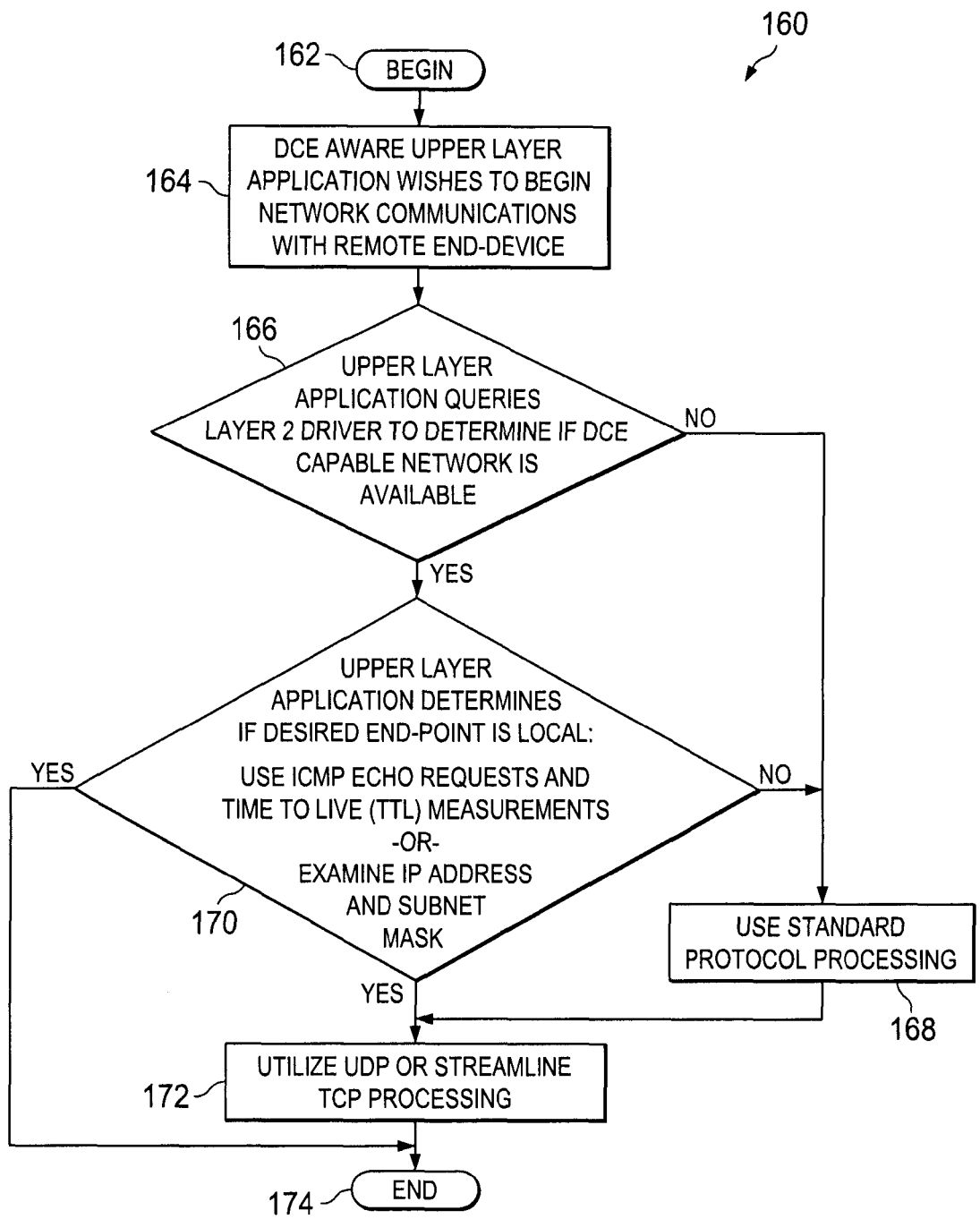
FIG. 3 illustrates a flow chart of an embodiment of method for ULP selection/manipulation based on detection of a lossless datacenter Ethernet network.

FIG. 3 illustrates a flow chart of an embodiment of a method/process 160 for ULP selection/manipulation based on detection of a lossless datacenter Ethernet network. The method 160 begins at 162 where the IHS 100 is operable to communicate via a network 119 to an end device 154 via a network 119. The method 160 then proceeds to block 164 where the data center Ethernet (DCE) becomes aware that an upper layer application (e.g., application layer 5, 138 such as, iSCSI 148) wants to begin network communications with another device, such as, end device 154. The method 160 then proceeds to decision block 166 where an upper layer application (e.g., iSCSI 148) queries a data link layer 2, 132 to determine if a DCE network is available for the communication. If no, a DCE network is not available, the method 160 proceeds to block 168 and the IHS 100 uses a standard protocol processing (e.g., TCP/IP) for the communication and the method 160 then ends at block 174. On the other hand, if yes, a DCE network is available, the method 160 proceeds to decision block 170 where an upper layer application (e.g., iSCSI 148) determines if the desired end point (e.g., end device 154) is local or remote (e.g., within a given network or external to a given network). If no, the desired end point is not local, the method 160 proceeds to block 168 and the IHS 100 uses a standard protocol processing (e.g., TCP/IP) for the communication and the method 160 then ends at block 174. On the other hand, if yes, the desired endpoint is local, the method 160 proceeds to block 172 and the IHS 100 uses a lower processor intensive communication protocol (e.g., UDP or a streamlined TCP protocol) for the communication and the method 160 ends at block 174.

In decision block 170, the method 160 may determine whether the desired end-point 154 is local by using Internet control message protocol (ICMP) echo requests and time to live (TTL) measurements. The method 160 may also determine whether the desired end-point 154 is local by examining the Internet protocol (IP) address and subnet mask.

It should be understood that a TCP is generally a connection-oriented protocol. This means that upon communication, this protocol requires handshaking to set up an end-to-end connection. A connection may be made from client to server and from then on, any data may be sent along that connection. On the other hand, UDP is a more simple message-based connectionless protocol where there is generally little or no effort to set up a dedicated end-to-end connection. Communication is achieved by transmitting information in one direction, from source to destination without checking to see if the destination is still there, or if it is prepared to receive more information. With UDP, data packets cross the network 119 in independent units.

In an embodiment, the node system and/or node system elements may be programmed by an administrator manually, or in an automated fashion using a local or centralized remote policy engine with DCE behavior policies. The node system elements (e.g., applications and/or protocol stacks) query the data-link layer 2, 132 to determine if they are DCE capable and if they are currently operating on a DCE capable network segment. As node system elements initiate communications with other network nodes, they may further evaluate the path to determine if the target of their communications are local to the DCE capable segment or on a remote subnet that may or may not be DCE capable. Based on detected DCE capability, target node locality, policy data established and a variety of other features, the node system/node system elements may attempt to initiate communications by selecting a transport layer 4, 136 protocol (e.g., TCP or UDP) most appropriate for current conditions and by manipulating protocol processing to lower processing requirements given the DCE capabilities. It should be understood that because the target network node is capable of supporting the protocol selection and/or modified protocol processing selected, communications should proceed in operable communication. In an embodiment, ULPs/Applications may also choose to renegotiate connectivity "up/down" with alternate protocols or streamlined protocol processing based on measurements associated with lower-layer robustness or lack thereof.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system (IHS), comprising:
    a network interface that is configured to connect to a network segment;
    a processing system that is coupled to the network interface; and
    a memory system that is coupled to the processing system and that includes instruction that, when executed by the processing system, cause the processing system to:
        determine whether a network segment connected to the network interface provides for guaranteed delivery of data;
        determine whether an endpoint device is within the network segment; and
        select a network communication protocol from a plurality of network communication protocols to provide the communications with the endpoint device;
        wherein the network communication protocol selected is a guaranteed delivery protocol when the network segment does not provide for guaranteed delivery of data or when the endpoint device is not within the network segment; and
        wherein the network communication protocol selected is a non-guaranteed delivery protocol when the network segment provides for guaranteed delivery of data and when the endpoint device is within the network segment.

2. The IHS of claim 1, wherein the determining whether the endpoint device is within the network segment includes at least one of: using an Internet control message protocol (ICMP) echo request and a time to live (TTL) measurement, and examining an Internet Protocol (IP) address and a subnet mask.

3. The IHS of claim 1, wherein the guaranteed delivery protocol is a transmission control protocol (TCP), and the non-guaranteed delivery protocol is a user datagram protocol (UDP).

4. The IHS of claim 1,
    wherein the processing system is configured to provide a first amount of processor capacity for protocol processing in response to the selection of the guaranteed delivery protocol; and
    wherein the processing system is configured to provide a second amount of processor capacity for protocol processing in response to the selection of the non-guaranteed delivery protocol, wherein the second amount of processor capacity for protocol processing is lower than the first amount of processor capacity for protocol processing.

5. The IHS of claim 1, further comprising:
    a storage area network (SAN) that is configured to provide the communications with the endpoint device.

6. The IHS of claim 5, wherein the SAN is configured to provide the communications with the endpoint device using the Internet Small Computer System Interface (iSCSI) protocol.

7. The IHS of claim 1, wherein the memory system includes instruction that, when executed by the processing system, cause the processing system to:
    detect that the communications with the endpoint device are not being delivered to the endpoint device and, in response, change the network communication protocol from the non-guaranteed delivery protocol to the guaranteed delivery protocol.

8. An information handling system (IHS), comprising:
    a processing system configured to provide protocol processing for communications with an endpoint device;
    a network interface that is configured to connect to a network segment;
    a protocol processing instruction system coupled to the processing system and the network interface, wherein the protocol processing instruction system is configured, for communications with an endpoint device, to:
        determine whether a network segment connected to the network interface provides for guaranteed delivery of data;
        determine whether the endpoint device is within the network segment; and instruct the processing system to provide protocol processing for the communications with the endpoint device;

wherein the instructing the processing system to provide protocol processing for the communications with the endpoint device causes the processing system to provide a first amount of processor capacity for protocol processing when the network segment does not provide for guaranteed delivery of data or when the endpoint device is not within the network segment, and wherein the first amount of processor capacity for protocol processing provides for the reliability of the transmission of the communications with the endpoint device; and wherein the instructing the processing system to provide protocol processing for the communications with the endpoint device causes the processing system to provide a second amount of processor capacity for protocol processing when the network segment provides for guaranteed delivery of data and when the endpoint device is within the network segment, and wherein the second amount of processor capacity for protocol processing is less than the first amount of processor capacity for protocol processing due to the second amount of processor capacity for protocol processing not providing for the reliability of the transmission of the communications with the endpoint device.

9. The IHS of claim 8, wherein the determining whether the endpoint device is within the network segment includes at least one of: using an Internet control message protocol (ICMP) echo request and a time to live (TTL) measurement, and examining an Internet Protocol (IP) address and a subnet mask.

10. The IHS of claim 8, wherein the instructing the processing system to provide protocol processing for the communications with the endpoint device that causes the processing system to provide a first amount of processor capacity for protocol processing includes selecting a guaranteed delivery network communication protocol for use by the processing system, and wherein the instructing the processing system to provide protocol processing for the communications with the endpoint device that causes the processing system to provide a second amount of processor capacity for protocol processing includes selecting a non-guaranteed delivery network communications protocol for use by the processing system.

11. The IHS of claim 9, wherein the guaranteed delivery network communication protocol is a transmission control protocol (TCP), and the non-guaranteed delivery network communications protocol is a user datagram protocol (UDP).

12. The IHS of claim 8, further comprising:
a storage area network (SAN) that is configured to provide the communications with the endpoint device.

13. The IHS of claim 12, wherein the SAN is configured to provide the communications with the endpoint device using the Internet Small Computer System Interface (iSCSI) protocol.

14. The IHS of claim 8, wherein the protocol processing instruction system is configured to:
detect that the communications with the endpoint device are not being delivered to the endpoint device; and
increase the amount of processor capacity provided by the processing system for protocol processing from the second amount of processor capacity such that the protocol processing provided by the processing system provides for the reliability of the transmission of the communications with the endpoint device.

15. A method for communicating with an endpoint device, the method comprising:
determining whether a network segment connected to a network interface provides for guaranteed delivery of data;
determining whether an endpoint device is within the network segment; and
instructing a processing system to provide protocol processing for communications with the endpoint device;
wherein the instructing the processing system to provide protocol processing for the communications with the endpoint device causes the processing system to provide a first amount of processor capacity for protocol processing when the network segment does not provide for guaranteed delivery of data or when the endpoint device is not within the network segment, and wherein the first amount of processor capacity for protocol processing provides for the reliability of the transmission of the communications with the endpoint device; and
wherein the instructing the processing system to provide protocol processing for the communications with the endpoint device causes the processing system to provide a second amount of processor capacity for protocol processing when the network segment provides for guaranteed delivery of data and when the endpoint device is within the network segment, and wherein the second amount of processor capacity for protocol processing is less than the first amount of processor capacity for protocol processing due to the second amount of processor capacity for protocol processing not providing for the reliability of the transmission of the communications with the endpoint device.

16. The method of claim 15, wherein the instructing the processing system to provide protocol processing for the communications with the endpoint device that causes the processing system to provide a first amount of processor capacity for protocol processing includes selecting a guaranteed delivery network communication protocol for use by the processing system, and wherein the instructing the processing system to provide protocol processing for the communications with the endpoint device that causes the processing system to provide a second amount of processor capacity for protocol processing includes selecting a non-guaranteed delivery network communications protocol for use by the processing system.

17. The method of claim 16, wherein the guaranteed delivery network communication protocol is a transmission control protocol (TCP), and the non-guaranteed delivery network communications protocol is a user datagram protocol (UDP).

18. The method of claim 15, wherein the communications with the endpoint device are provided by storage area network (SAN).

19. The method of claim 18, wherein the SAN provides the communications with the endpoint device using the Internet Small Computer System Interface (iSCSI) protocol.

20. The method of claim 15, further comprising:
detecting that the communications with the endpoint device are not being delivered to the endpoint device; and
increasing the amount of processor capacity provided by the processing system for protocol processing from the second amount of processor capacity such that the protocol processing provided by the processing system provides for the reliability of the transmission of the communications with the endpoint device.

* * * * *